United States Patent [19]

Takeuchi

[11] Patent Number: 4,924,991
[45] Date of Patent: May 15, 1990

[54] CLUTCH COVER ASSEMBLY WITH SELF-ADJUSTING PRESSURE PLATE

[75] Inventor: Hiroshi Takeuchi, Neyagawa, Japan

[73] Assignee: Kabushiki Kaisha Daikin Seisakusho, Osaka, Japan

[21] Appl. No.: 335,090

[22] PCT Filed: Apr. 25, 1988

[86] PCT No.: PCT/JP88/00405
§ 371 Date: Dec. 6, 1988
§ 102(e) Date: Dec. 6, 1988

[87] PCT Pub. No.: WO88/08492
PCT Pub. Date: Nov. 3, 1988

[30] Foreign Application Priority Data

Apr. 27, 1987 [JP] Japan ............... 62-105000

[51] Int. Cl.$^5$ ............................................. F16D 13/75
[52] U.S. Cl. ................................................ 192/111 A
[58] Field of Search ............ 192/70.25, 109 A, 111 A; 188/71.8, 196 V, 201

[56] References Cited

U.S. PATENT DOCUMENTS 3,478,843 11/1964 Kraeplin .................... 192/111 A
4,226,307 10/1980 Dorot ........................ 188/196 V

FOREIGN PATENT DOCUMENTS 824649 12/1951 Fed. Rep. of Germany ..... 188/71.8
2606477 5/1988 France ......................... 192/111 A
85250 7/1978 Japan ........................... 192/111 A

*Primary Examiner*—Rodney H. Bonck
*Assistant Examiner*—Nicholas Whitelaw
*Attorney, Agent, or Firm*—Armstrong, Nikaido, Marmelstein, Kubovcik & Murray

[57] ABSTRACT

A clutch cover assembly comprising first and second fulcrum rings movable in an axial direction on a pressure plate body and having fulcrum points, respectively, inclined faces formed on a face of each of the fulcrum rings, first and second slide keys slidable in a radial direction and each having an inclined face and first and second springs forcing the keys outwardly. The fulcrum points are automatically adjusted according to wear of the clutch facings to extend the life of the clutch.

2 Claims, 2 Drawing Sheets

CLUTCH COVER ASSEMBLY WITH SELF-ADJUSTING PRESSURE PLATE

TECHNICAL FIELD

This invention relates to a clutch cover assembly having a diaphragm spring.

BACKGROUND ART

A clutch cover assembly having long life and a diaphragm spring is required for taxis, business car and the like.

As an example of long-life, it is known that the life of a clutch is increased by fastening the facing to the clutch disc without rivets.

A conventional clutch cover assembly is shown in FIG. 5. A wear-in of the facing, in the facing used part D is established by a load characteristic as shown in FIG. 6. Since the wear-in D has a limit, an incline of the diaphragm spring, at clutch engagement, increases according to the increase of wear. Thus, the characteristic load is transformed and it is not possible to use the facing to the maximum quantity of wear. Especially in a twin type clutch, it is more difficult than in a single type clutch to get a long-life because the twin type clutch require double clearances compared to the single type clutch.

An object of this invention is to maintain initial set load even at the time of wear of the facings, and get a long-lived clutch without transforming pressure load.

DISCLOSURE OF THE INVENTION

In order to accomplish the above object, the clutch cover assembly accordance to the invention comprises;

a pressure plate divided into a plate body contactable against a facing of a clutch disc and first and second fulcrum rings, the fulcrum rings being movable in the axial direction with the first fulcrum ring disposed at the inner side of the second fulcrum ring.

Two fulcrum points are formed on the first and second fulcrum rings with little space therebetween in the radial direction.

Stopper steps are formed on the fulcrum rings so that the fulcrum point of the second fulcrum ring does move beyond the fulcrum point of the first fulcrum ring in the direction of the diaphragm spring side.

Inclined faces with incline outwardly of the clutch toward the pressure plate body are formed on the face of the fulcrum rings.

A first and second slide keys, slidable in the radial direction, are disposed between the fulcrum rings and the pressure plate body.

A first spring forces the inner first key outwardly.

A second spring, weaker than the first spring, is disposed between the slide keys.

The fulcrum points become high or spaced at longer distance from the pressure plate by wedge action of the first and the second slide keys and the first and second springs. Consequently, pressure plate is adjusted to the wearing facings and the life of the clutch is lengthened.

Because the fulcrum points are automatically adjusted as the facings wear, a set load is maintained on the facings throughout the use of the clutch.

Namely, the facing load is set at a load peak when the clutch is constructed, and is maintained at the same value throughout the life of the clutch. Consequently, the torque transmission capacity of the clutch is not reduced by wear.

Moreover, because the fulcrum points become higher as the clutch wears, the inclination of the diaphragm spring at clutch engagement is not changed. Consequently, the release operation remains constant.

BEST MODE FOR PRACTICING OUT THE INVENTION

Figure 1:
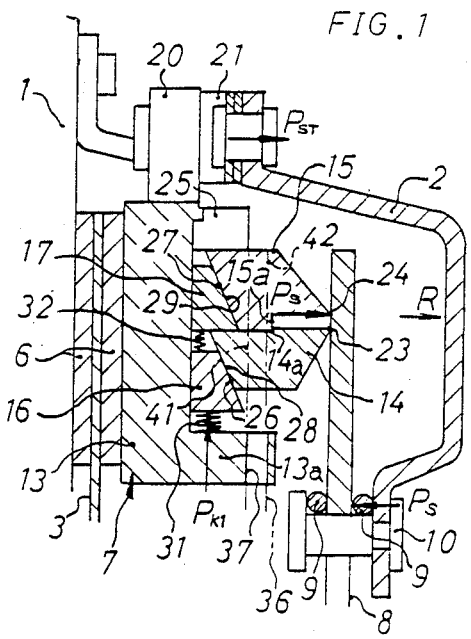
FIG. 1 is a vertical sectional view of a clutch cover assembly of the present invention with an initial set load.

FIG. 1 is a diaphragm spring type of a clutch cover assembly in accordance with this invention. Clutch cover 2 is fixed, at the input-side, to flywheel 1. Facings 6 of a clutch disc 3, a pressure-plate (pressure plate structure) 7 and a diaphragm spring 8 are arranged in order from the flywheel-side between the flywheel 1 and an end wall of the clutch cover 2. The diaphragm spring 8 is held between two wire rings 9, the wire rings 9 being held, circularly, by a plurality of stud pins 10 fixed to the end wall of the clutch cover 2.

An inner peripheral end of the diaphragm spring 8 faces a release bearing (not shown). An outer peripheral end of the diaphragm spring 8 is movable in the direction of arrow R around the wire rings 9 as a fulcrum. The outer peripheral end of the diaphragm spring 8 is moved when the release bearing pushes the inner peripheral end of the diaphragm spring 8 toward flywheel 1.

The pressure plate 7 comprises a plate body 13 for pressing facing 6, a first and a second fulcrum rings 14, 15, first and second slide keys 16, 17 and first and second springs 31, 32. First and second annular fulcrum points 23, 24 are formed on the diaphragm spring side of the fulcrum rings 14, 15. Second fulcrum ring 15 is movably fitted by movement in the axial direction on the radially inner face of an outer end holder 25, FIG. 1, of the plate body 13. First fulcrum ring 14, smaller than the second fulcrum ring 15, is movably fitted for movement in the axial direction on the radially inner face of the second fulcrum ring 15.

Step portions 14a, 15a are formed face-to-face, respectively, on fixed, abutting portions of the fulcrum rings 14, 15. The second fulcrum ring 15 is controlled by contacting of the steps 14a, 15a to moving in the direction of arrow R. Moreover, the fulcrum points 24, 23 are kept in vertical alignment, FIGS. 1 and 3, by contacting of the steps 14a, 15a.

Inclined faces 26, 27, FIG. 1, are formed on the fulcrum ring 14, 15 and, from their inner peripheral ends toward their outer peripheral ends incline inwardly toward plate body 13. First slide key 16 is disposed between the first fulcrum ring 14 and the plate body 13.

Second slide key 15 is disposed between the first fulcrum ring 14 and plate body 13.

First slide key 16 comprises a plural of circular arc pieces arranged in a divided ring. Second slide key 17 also comprises a plural of circular arc pieces arranged in a divided ring. The slide keys 16, 17 are slidably in the radial direction on the face of plate body 7.

Inclined faces 28, 29 are formed on the slide keys 16, 17 and incline inwardly and parallel to faces 26, 27 of fulcrum rings 14, 15. The inclined face 28 of the first slide key 16 is slidable and contacted with the inclined face 26 of first fulcrum ring 14. The inclined face 29 of the second slide key 17 is slidable and contacted with the inclined face 27 of the second fulcrum ring 15.

The inclination angle of the faces 26, 27, 28, 29 is such that the faces and members slide by only pressure load in the axial direction.

The first spring 31 is compressed between an inner peripheral annular projection 13a of the plate body 13 and an inner face of the first slide key 16. The first slide key 16 is forced by the force Pk1 of the first spring 31. The second spring 32 is weaker than the first spring 31, that is, the modulus of the second spring 32 is less than that of the first spring 31.

The second spring 32 is compressed between an inner peripheral face of the second slide key 17 and an outer peripheral face of the first slide key 16. Although springs 31, 32 in FIG. 1 are shown as coil springs for easy understanding, it is possible to use such a C ring, such as a piston ring in place of the first coil spring 31 and to use a waving C ring in place of the second coil spring 32.

For assembly purposes, a pin-insertion hole 37, positioned in a radial direction, is formed on the inner projection portion 13a of the plate body 13 and pin-insertion holes 41, 42, also positioned in a radial direction are formed on the fulcrum rings 14, 15. A pin 36 is inserted in the hole 37, 41, 42, establishing the heights of fulcrum ring 14, 15 and, hence, the positions of the fulcrum points 23, 24 for purposes of assembly. Once the clutch is assembled, diaphragm spring 8 and cover 2 are assembled and attached, pin 36, inserted for assembly, is removed.

Function will be described hereunder. FIG. 1 shows the initial set state. Fulcrum points 23, 24 are in contact with the diaphragm spring 8. Ps designates the pressure load, Pst designates the reaction force of the strap plate 21. The outer peripheral end of the diaphragm spring 8 moves in the direction of the arrow R during the release operation, so that the pressure plate assembly 7 moves in the direction of arrow R by the reaction force of the strap plate 21. The clutch is then released. At the time of release, the outer peripheral end of the diaphragm spring 8 inclines toward in the direction of arrow R and a clearance is established between the second fulcrum point 24 and the diaphragm spring 8. Both fulcrum points 23, 24 are located at a same vertical line.

Figure 2:
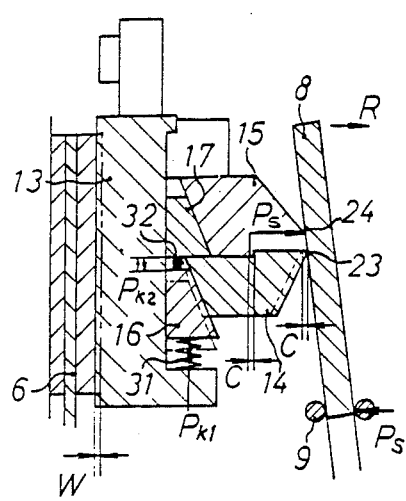
FIG. 2 is a vertical sectional view of the clutch cover assembly of FIG. 1 with the facing worn but before adjusting.

When the facings 6 have been worn, the outer peripheral end of the diaphragm spring 8 inclines toward the pressure plate 7 at clutch engagement as shown in FIG. 2. Therefore, a clearance C is established between the fulcrum point 23 of the first fulcrum ring 14 and the diaphragm spring 8 as shown by dotted line, FIG. 2. At this time, the pressure load Ps acts on the second fulcrum ring 15. After such clearance is established, the first slide key 16 is moved outwardly, in the radial direction, by means of the spring force Pk1 of the first spring 31. Consequently, the first fulcrum ring 14 is pushed in the direction of arrow R by first slide key 16 and contacts diaphragm spring 8 so that the clearance C is closed as shown by the continuous line. At the same time, the second spring 32 is compressed changing the power Pk2.

Figure 3:
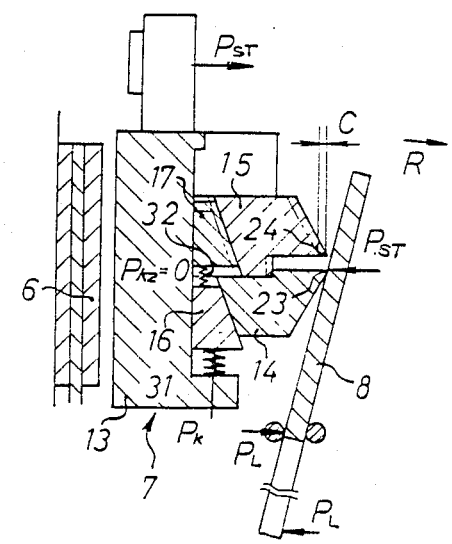
FIG. 3 is a vertical sectional view of the clutch cover assembly of FIG. 2 with the clutch released.
Figure 5:
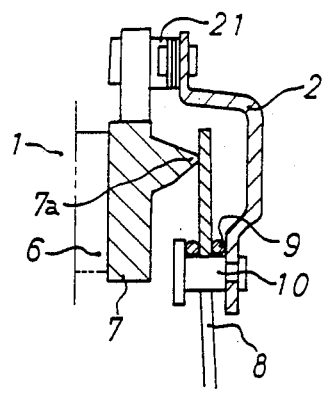
FIG. 5 is a vertical sectional view of a conventional clutch assembly.
Figure 6:
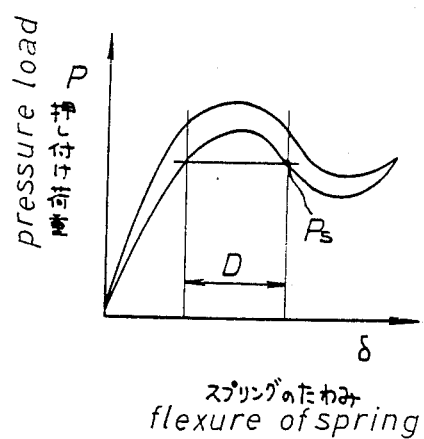
FIG. 6 is a graph showing the characteristic of the load.

Then, according to release from the state shown by the continuous line of FIG. 2, the pressure load Ps is released from the second ring 15 by the release load PL as shown in FIG. 3, and pressure plate 7 is released by the reaction force Pst of the strap plate 21. At this time, the reaction force Pst of the strap plate 21 acts only on the first fulcrum ring 14. The second fulcrum ring 15 does not receive any load. Therefore the second fulcrum ring 15 moves in the direction of the arrow R and the second slide key 17 moves outwardly by the reaction force Pk2 of the second spring 32. The second fulcrum ring 15 is stopped by contact between step portions 14a, 15a. The second fulcrum ring 15 is not contacted by the diaphragm spring 8 because the diaphragm spring 8 is inclined.

Figure 4:
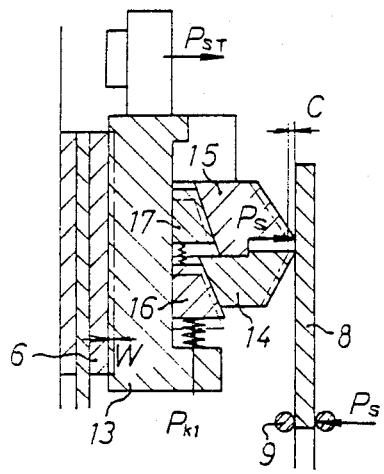
FIG. 4 is a vertical sectional view of the clutch cover assembly of FIG. 3 with the clutch re-engaged after adjusting.

FIG. 4 shows the clutch reengaged after disengagement in FIG. 3. The clearance C, corresponding to the wear W disappears, so that the clutch is set to the initial set load as shown in FIG. 1. Namely the heights of the fulcrum rings 14, 15 in FIG. 4 adjust to take up the clearance C.

To sum up, because the fulcrum points 23, 24 are automatically adjusted by the wedge-function of the slide keys 16, 17 and the forces of the springs 23, 24, the clutch disk facings 6 remain available for a longer wear limit. Therefore, the term for replacement with new clutch is prolonged and the life of the clutch is prolonged.

Moreover, the set load is constant because the fulcrum points 23, 24 automatically adjust according to wear of the facings 6.

By setting the initial set load at a peak of load characteristic when structuring the clutch, a set load, the same as the initial load, is maintained in spite of wear of the disc facings. Performance for torque transmission is constant and is good.

Moreover, inclination of the diaphragm spring 8 is not varied. Hence, release characteristic are not varied because the fulcrum points 23, 24 automatically adjust according to wear of the facings 6. Consequently, an operator may be able to release constantly with the same release operation.

INDUSTRIAL APPLICABILITY

A clutch cover assembly according to the present invention is suitable to an automobile clutch, especially for taxis and business cars, in which the clutch is released frequently. The clutch will have a longer life.

What is claimed is:

1. A clutch cover assembly comprising:
   a pressure plate (7) having a plate body (13) and first and second fulcrum rings (14, 15) movable in an axial direction of said cover assembly, said first fulcrum ring (14) being disposed in sliding contact on an inner side surface of said second fulcrum ring (15),
   fulcrum points (23, 24) formed on said first and second fulcrum rings (14, 15), respectively, and spaced from each other in the radial direction of said cover assembly,
   stopper steps (14a, 15a) formed on said fulcrum rings (14, 15) so that the fulcrum point (24) of the second fulcrum ring (15) moves over the fulcrum point

(23) of said first fulcrum ring (14) toward a diaphragm spring side, inclined faces (26, 27) which incline outwardly toward said plate body (13) formed on a face of said fulcrum rings (14, 15) facing away from said plate body, first and second slide keys (16, 17) slidable in a radial direction and disposed between said fulcrum rings (14, 15) and said pressure plate body (13), a first spring (31) forcing said first slide key (16) outwardly, and a second spring (32), weaker than said first spring (31) and disposed between said slide keys (16, 17).

2. A clutch cover assembly as set forth in claim 1, in which said first and second springs (31, 32) are coil springs.

* * * * *